(12) United States Patent
Ozonat et al.

(10) Patent No.: US 8,255,185 B2
(45) Date of Patent: Aug. 28, 2012

(54) AUTOMATED INFORMATION TECHNOLOGY MANAGEMENT

(75) Inventors: Mehmet Kivanc Ozonat, San Jose, CA (US); Ira Cohen, Modiin (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 878 days.

(21) Appl. No.: 12/252,355

(22) Filed: Oct. 15, 2008

(65) Prior Publication Data

US 2010/0094590 A1    Apr. 15, 2010

(51) Int. Cl.
*G06F 17/18*  (2006.01)
*G06F 19/00*  (2011.01)
*G06F 11/30*  (2006.01)
*G21C 17/00*  (2006.01)

(52) U.S. Cl. .................. 702/179; 702/182
(58) Field of Classification Search .......... 702/179, 702/182
See application file for complete search history.

(56) References Cited

U.S. PATENT DOCUMENTS

| 5,870,746 A * | 2/1999 | Knutson et al. .............. 1/1 |
| 2008/0065436 A1 | 3/2008 | Wu et al. |
| 2008/0221911 A1 | 9/2008 | Cherkasova et al. |
| 2008/0221941 A1 | 9/2008 | Cherkasova et al. |
| 2010/0083055 A1 * | 4/2010 | Ozonat .................. 714/47 |

* cited by examiner

*Primary Examiner* — Michael Nghiem

(57) ABSTRACT

Systems, articles of manufacture, and associated computer-executed methods determine an optimum temporal segmentation for automated information technology (IT) management. A computer-executed method detects changes in a performance metric in an automated information technology (IT) management system comprising defining a plurality of temporal segments as sets of contiguous time samples wherein time samples within a segment are mutually more similar in terms of performance metric behavior than time samples in previous and subsequent segments, and discovering the segments using an information-theoretical approach. Detecting changes in the performance metric can further comprise associating cost with the segments that is lesser for homogeneous metric behavior and greater for heterogeneous metric behavior within a segment, and finding segmentation that minimizes the cost using dynamic programming.

10 Claims, 9 Drawing Sheets

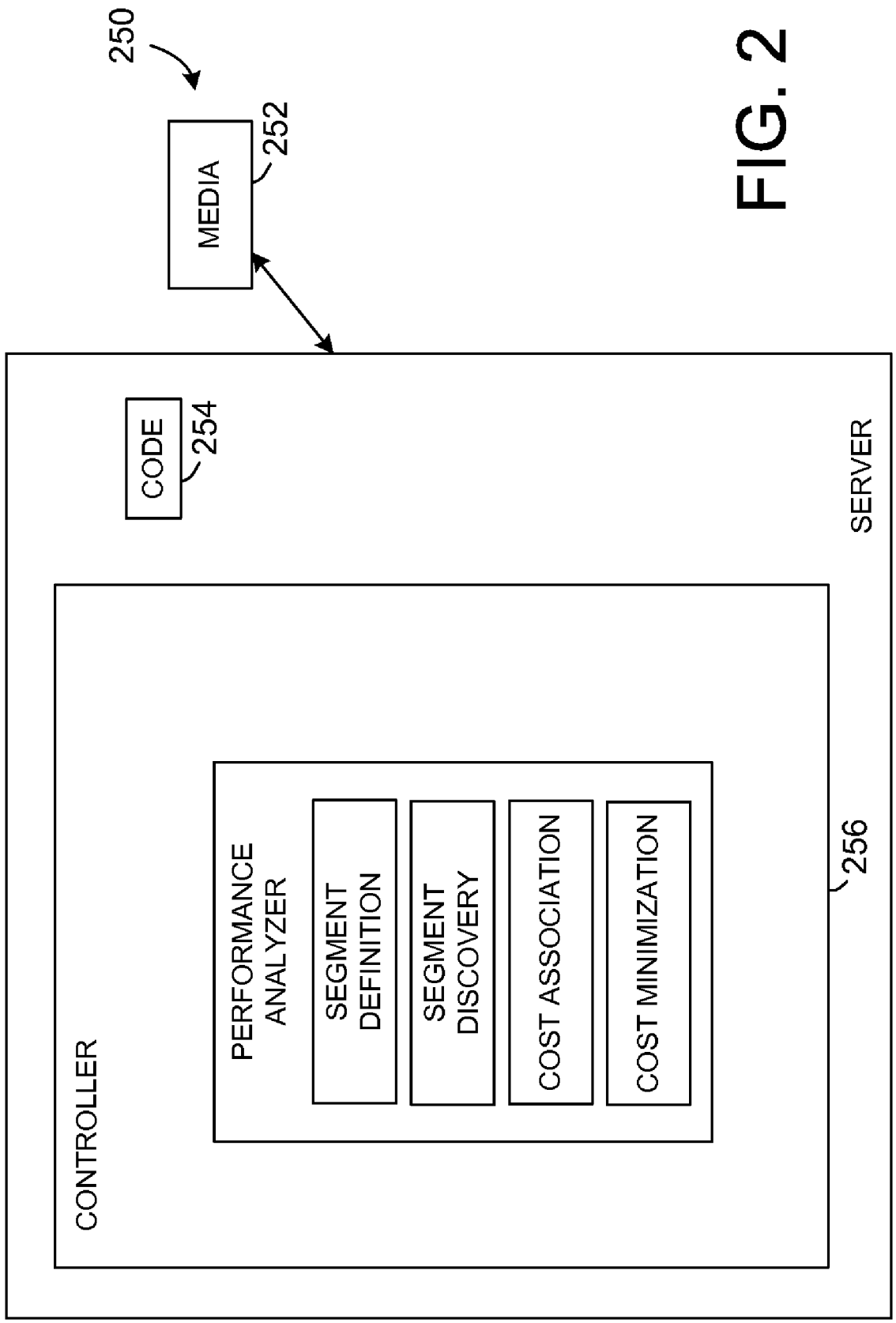

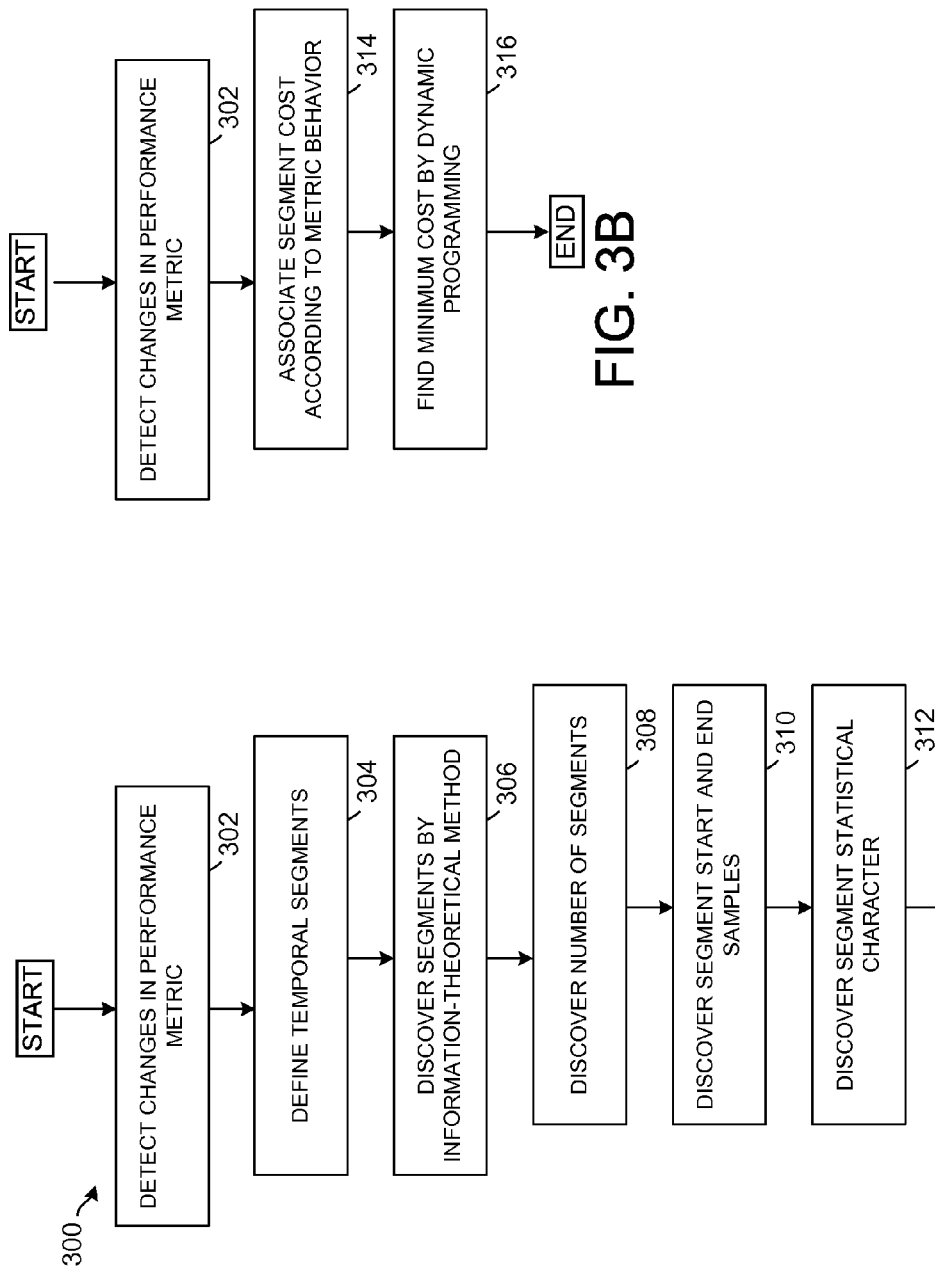

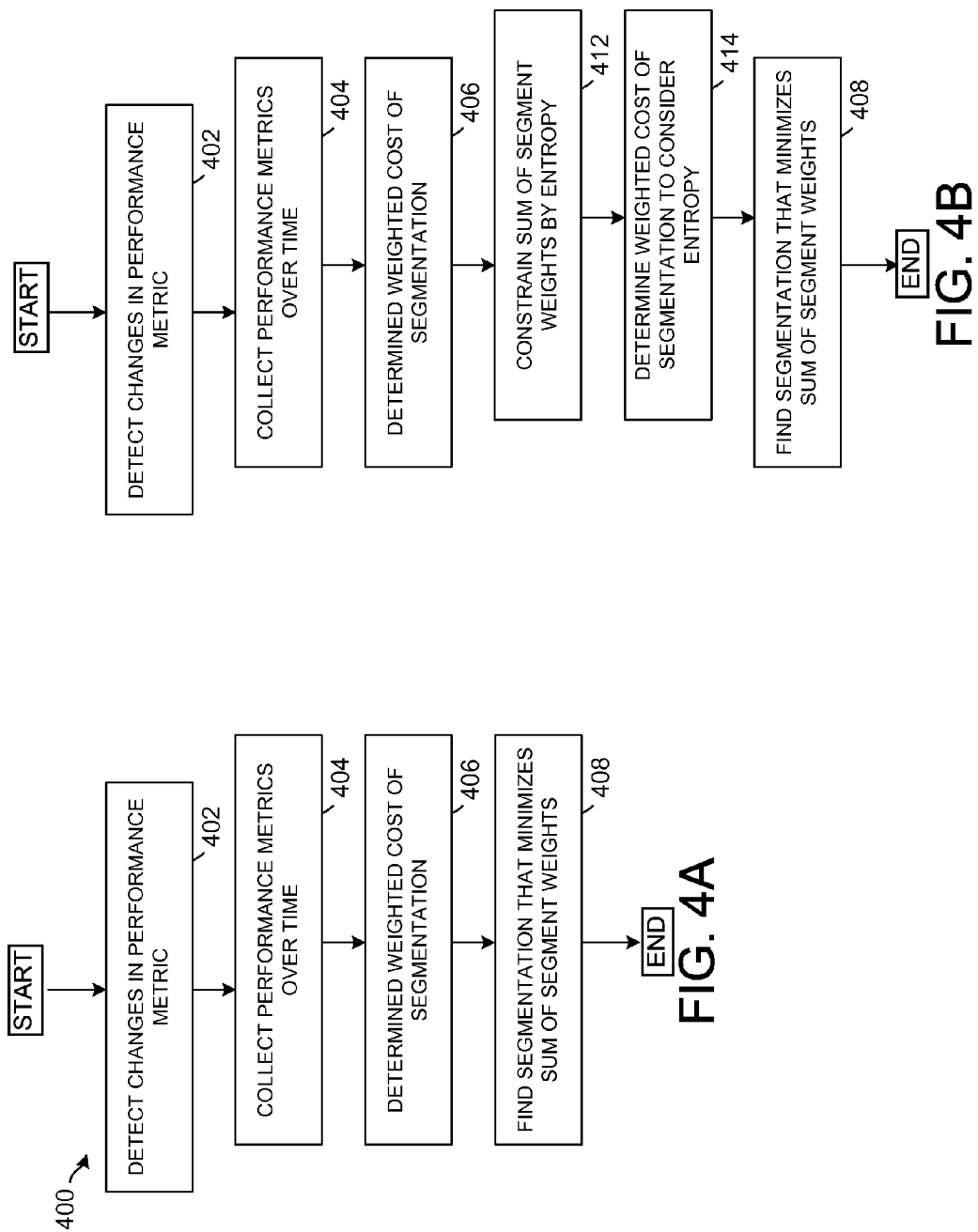

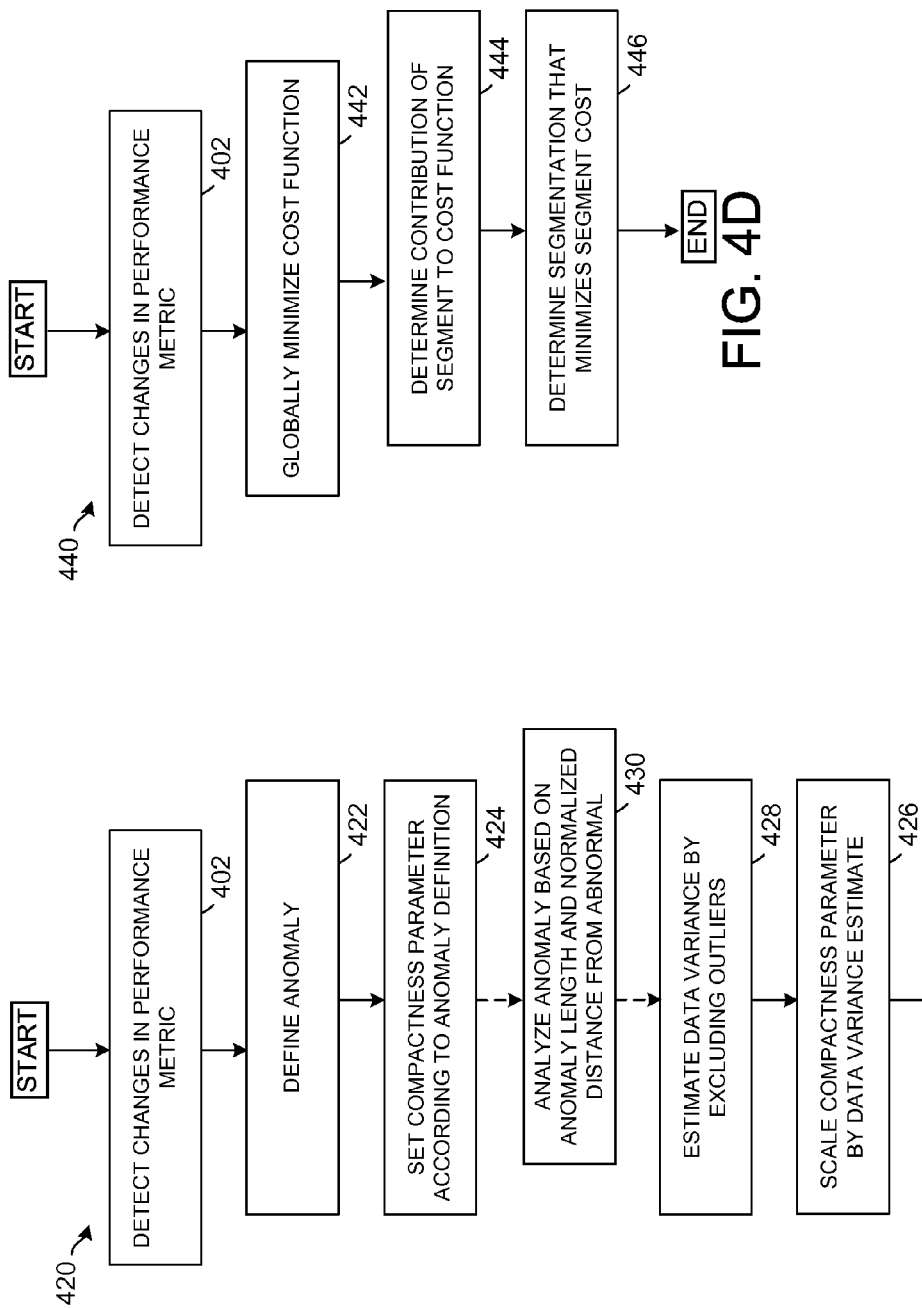

AUTOMATED INFORMATION TECHNOLOGY MANAGEMENT

BACKGROUND

Existing IT performance management tools enable detection of performance changes by thresholding on performance metrics. The tools detect the presence of a performance change when a performance metric passes a threshold. For example, a threshold can be set for each performance metric and an alarm is generated at the time samples when at least one of the performance metrics exceeds its threshold. In a specific example, an alarm can be generated when the response time for a web page exceeds a threshold of 3 seconds. Often, two thresholds including upper and lower thresholds are set, and an alarm is generated when a performance metric either exceeds the upper threshold or falls below the lower threshold.

The thresholds can be set either manually or automatically. Setting thresholds manually is challenging since, in a large-scale distributed service, typically hundreds to thousands of performance metrics exist, each with a potentially different characteristic. An alternative is automated threshold setting in which thresholds are based on the statistics such as means, standard deviations, or percentiles, and are computed using historical measurements of the metrics. For instance, the thresholds can be set at 5th and 95th percentiles of the historical measurements of a metric, or at three standard deviations above and below the average or mean of the historical measurements of a metric.

Detecting changes through thresholding is a poor approach due for several reasons. First, thresholds are misleading when the performance metric shows multiple behaviors due to cyclic variations, for example weekly or monthly variations. In such cases, a single set of thresholds, such as a single pair of upper and lower thresholds, is insufficient to capture the behavior and for basing detection decisions. Second, thresholding assumes that the impact of change is due only to the amount of the change and does not take into account the duration of the change, leading to false change detection alarms as well as missed change detections. Finally, thresholding does not provide a global view of the detected changes. For example, information regarding when the new performance metric behavior starts and ends is not clear, resulting in difficulty in determining accurate diagnosis and recovery decisions following the detection of a change.

SUMMARY

Embodiments of systems, articles of manufacture, and associated computer-executed methods determine an optimum temporal segmentation for automated information technology (IT) management. A computer-executed method detects changes in a performance metric in an automated information technology (IT) management system comprising defining a plurality of temporal segments as sets of contiguous time samples wherein time samples within a segment are mutually more similar in terms of performance metric behavior than time samples in previous and subsequent segments, and discovering the segments using an information-theoretical approach. Detecting changes in the performance metric can further comprise associating cost with the segments that is lesser for homogeneous metric behavior and greater for heterogeneous metric behavior within a segment, and finding segmentation that minimizes the cost using dynamic programming. The segments can be discovered by discovering the number of segments, discovering starting and ending time samples for the segments, and discovering statistical character of the segments comprising mean vectors and covariance matrices.

BRIEF DESCRIPTION OF THE DRAWINGS

Embodiments of the invention relating to both structure and method of operation may best be understood by referring to the following description and accompanying drawings:

FIG. 2 is a schematic block diagram depicting an embodiment of an article of manufacture implementing an automated information technology (IT) management system that optimizes temporal segmentation;

FIGS. 3A through 3D are flow charts illustrating one or more embodiments or aspects of a computer-executed method for determining optimum temporal segmentation for automated information technology (IT) management; and FIGS. 4A through 4D are flow charts showing one or more embodiments or aspects of a computer-executed method for determining optimum temporal segmentation for automated information technology (IT) management.

DETAILED DESCRIPTION

Figure 1A:
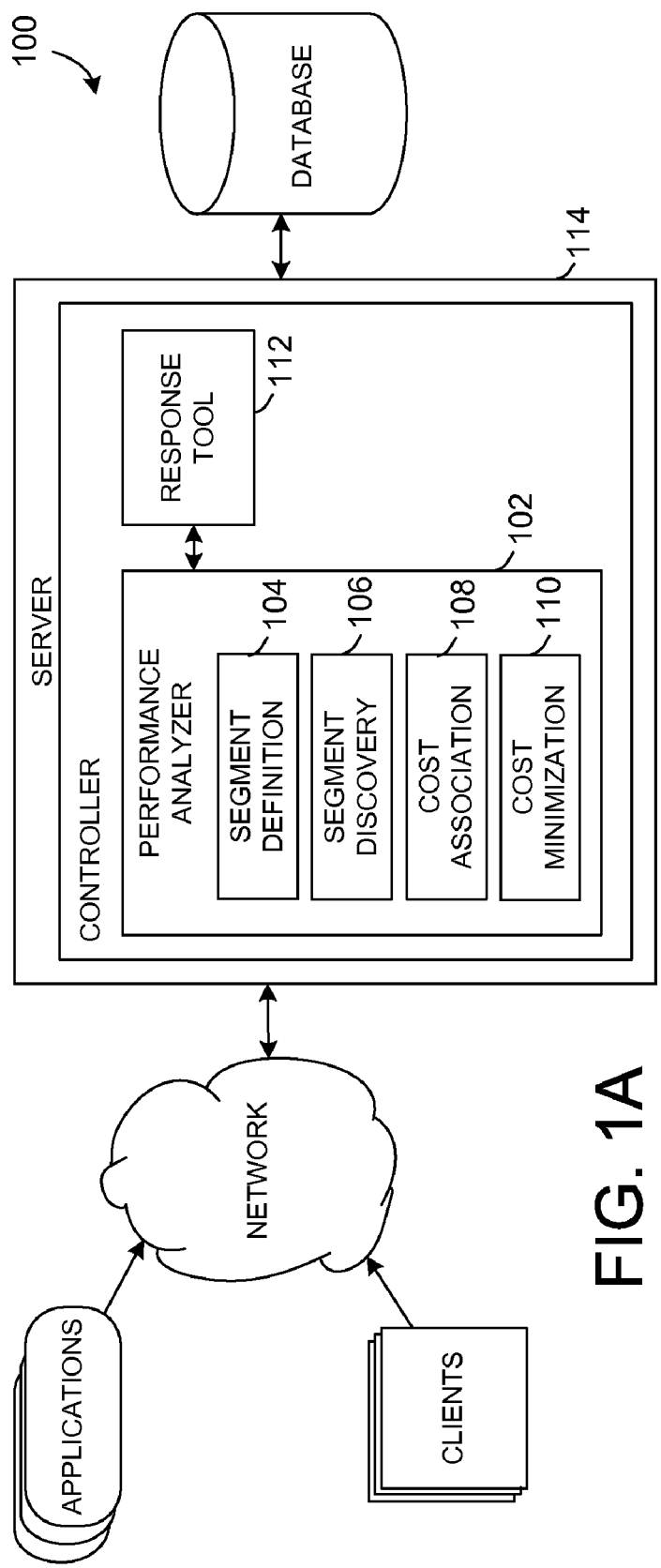
FIGS. 1A, 1B, 1C, and 1D are schematic block and pictorial diagrams showing embodiments of an automated information technology (IT) management system that optimizes temporal segmentation.

Embodiments of systems, articles of manufacture, and associated operating methods enable optimum temporal segmentation for automated information technology (IT) management.

For large-scale distributed web services, changes in the performance metric behavior are indications of either service problems or cyclic performance behavior. In the case of service problems, detection of the changes, followed by the diagnosis and recovery of the problems, is highly useful to avoid loss of revenue for the service providers and reduced satisfaction of the service users. In the case of cyclic performance behavior, such as occurs because application throughputs for weekdays and weekends are often different, detection of the changes in the performance behavior is useful for capacity planning to use system resources efficiently. Both online detection, such as detection of anomalies in real time as metric measurements are acquired, and offline detection including detection of anomalies in the past measurements (in the past week or past month for understanding the service behavior, changes in the behavior, and any recurring problems) facilitate discovery and addressing service problems and capacity planning.

The impact of the change in the performance metric behavior is measured by both the amount of the change and the duration of the change. A small change in a performance metric, for instance, may have a significant impact on the service if its duration is long, while a large change in the metric that lasts for only a single time epoch can often be ignored as an outlier.

Detecting performance changes in IT environments are highly useful for discovering and recovering from service problems and for efficient capacity planning. Existing management tools include threshold-based detection tools which have many shortcomings including the need to set a threshold for each metric, the inability to take the duration of change into account, and the inability to account for cases when metrics exhibit cyclic performance behavior.

The illustrative systems, articles of manufacture, and associated operating methods enable an approach for detecting performance changes without thresholding, thereby addressing shortcomings of threshold-based techniques. The technique can use only a single parameter which is mathematically related to a definition of change in terms of change duration and amount. The illustrative techniques can determine how the single parameter is set based on the mathematical relation, possibly taking into consideration other information, such as actual data and simulations.

The illustrative systems, articles of manufacture, and associated operating methods enables a thresholdless approach to detecting performance changes in IT environments and avoids the shortcomings of the threshold-based techniques such as the need to set a threshold, high ratios of false alarms and missed detections, and addresses the case cyclic performance behavior. The technique can use only a single parameter which is mathematically related to the definition of change in terms of the change duration and amount.

The illustrative systems, articles of manufacture, and associated operating methods enable a thresholdless, segment-based approach to detecting changes in the performance metric behavior for large-scale distributed web services, where a segment is a set of contiguous time samples such that the time samples within the segment are more similar (in terms of their performance metric behavior) to one another than the time samples in the previous and next segments. The technique involves discovery of the changes, for example in the segments. Discovery implies finding the number of segments, the locations of the segments and the statistical character of the segments using information-theoretic and signal processing techniques. The technique can use a single parameter which is mathematically related to the definition of change in terms of the change duration and amount, and enables setting of the parameter.

Referring to FIGS. 1A, 1B, 1C, and 1D, schematic block and pictorial diagrams illustrate embodiments of an automated information technology (IT) management system that optimizes temporal segmentation. As shown in FIG. 1A, an illustrative automated information technology (IT) management system 100 comprises a performance analyzer 102 configured for detecting changes in a performance metric. The performance analyzer 102 comprises multiple logic elements. One logic 104 defines a plurality of temporal segments as sets of contiguous time samples wherein time samples within a segment are mutually more similar in terms of performance metric behavior than time samples in previous and subsequent segments. Another logic 106 discovers the segments using an information-theoretical approach comprising discovering number of segments, discovering starting and ending time samples for the segments, and discovering statistical character of the segments comprising mean vectors and covariance matrices. Another logic 108 associates cost with the segments that is lesser for homogeneous metric behavior and greater for heterogeneous metric behavior within a segment. A further logic 110 finds segmentation that minimizes the cost using dynamic programming.

In some embodiments, the IT management system 100 can further comprise a response tool 112 that responds to detection of changes in the performance metric, and a server 114 that executes the performance analyzer 102, and the response tool 112.

Figure 1B:
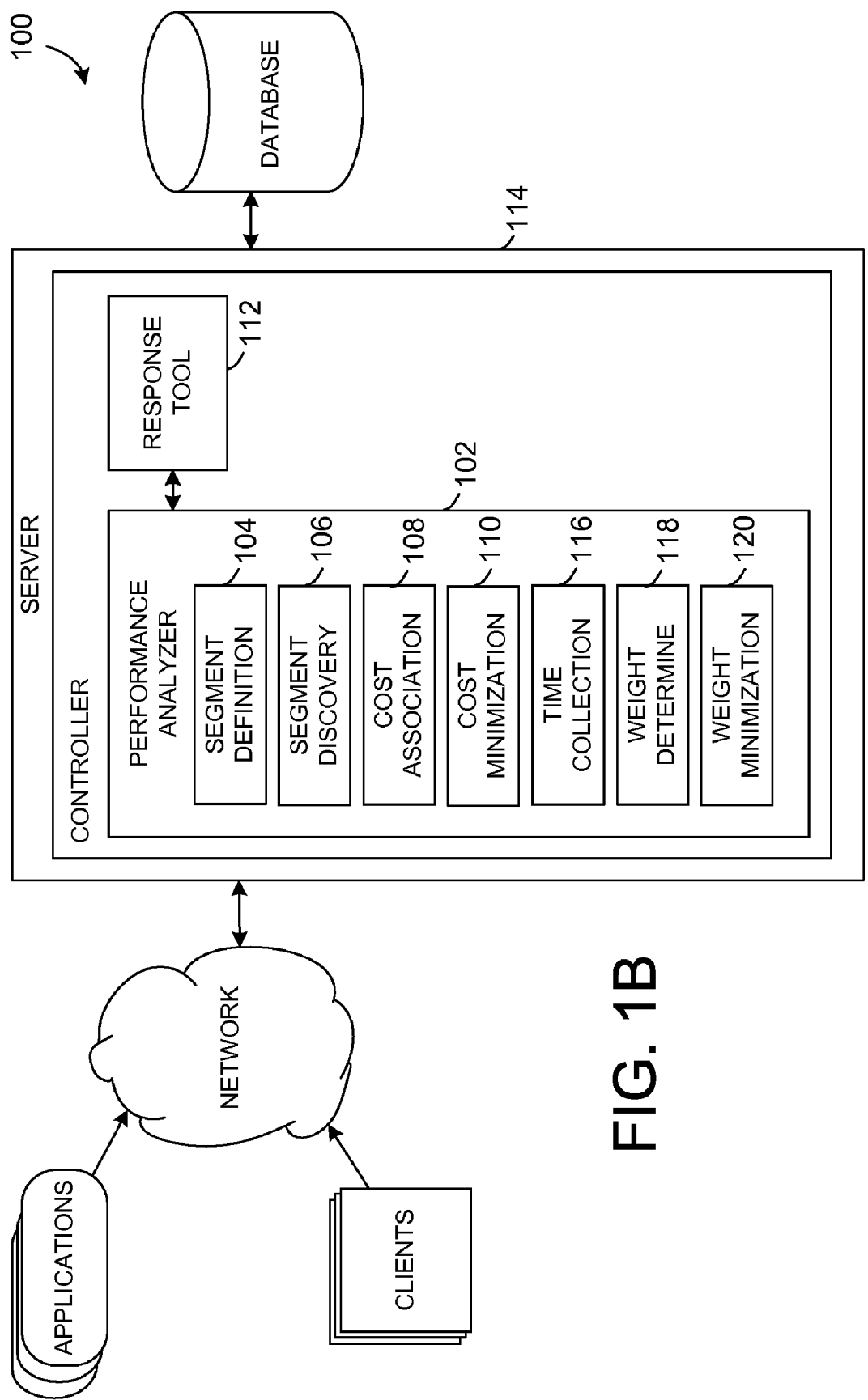

Referring to FIG. 1B, an IT management system embodiment can include a performance analyzer 102 further comprising a logic 116 that collects performance metrics over time as a plurality of temporal segments including contiguous time samples wherein time samples within a segment are mutually more similar than time samples in previous and subsequent segments. Another logic element 118 can determine a weighted cost of segmentation $w_{i,j}$ according to equation (1):

$$w_{i,j} = \sum_{t=i}^{j} (X_t - \mu_{i,j})^2 + \lambda; \tag{1}$$

wherein $X_t$ is a value of the performance metric, $\mu_{i,j}$ is an average value of the performance metric between time samples i and j, and $\lambda$ is a compactness parameter. A further logic element 120 a logic that finds segmentation that minimizes the sum of segment weights $w_{i,j}$ for a specified value of $\lambda$ using dynamic programming.

Figure 1C:
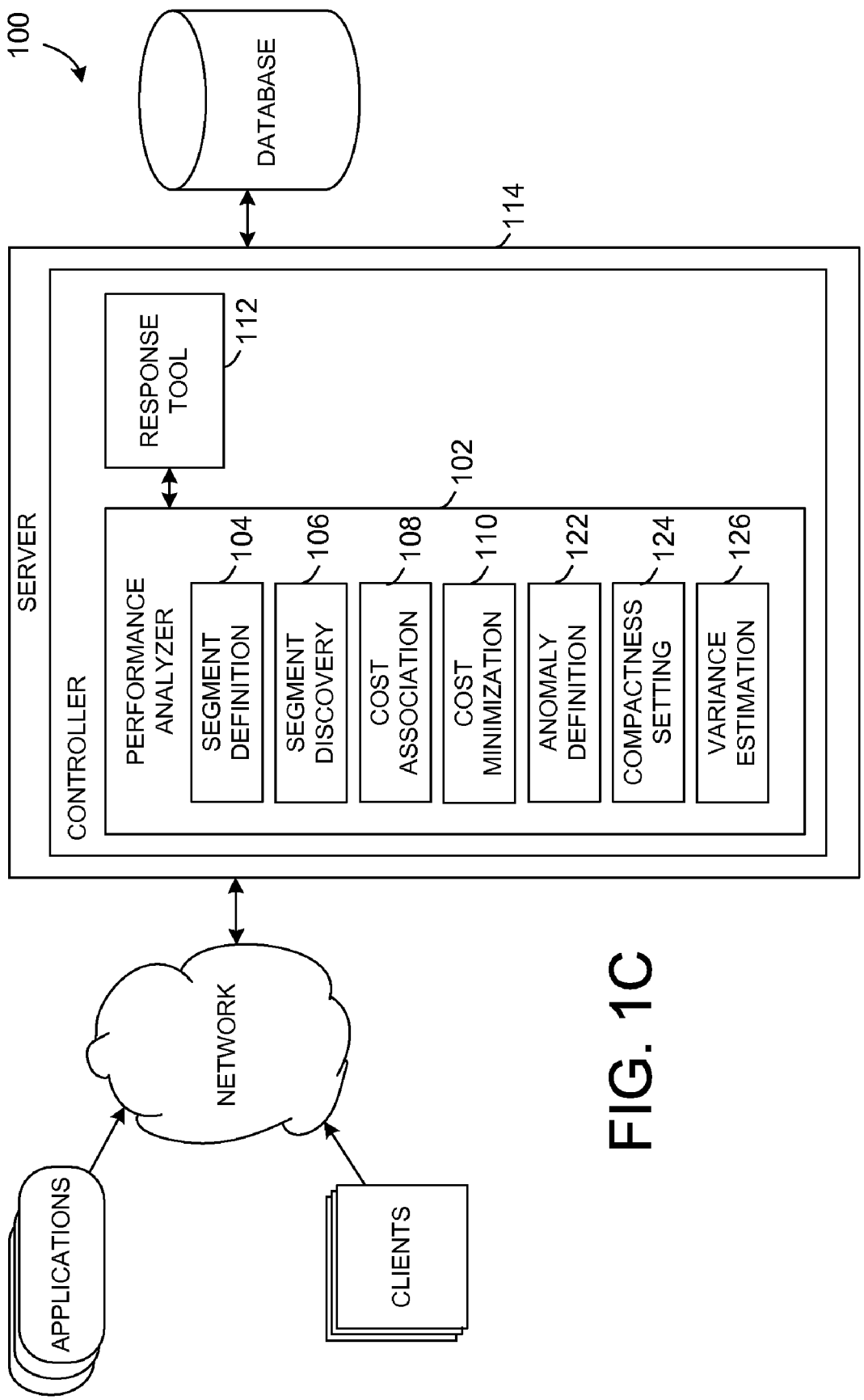

Referring to FIG. 1C, an IT management system embodiment can include a performance analyzer 102 further comprising a logic 122 that defines an anomaly determined by a length m of an anomalous segment and deviation of the anomalous segment from normal behavior. A logic 124 sets the compactness parameter $\lambda$ according to the defined anomaly, and scales the compactness parameter $\lambda$ by an estimate of data variance according to equation (2):

$$\lambda = \frac{m(\mu_n - \mu_m)^2}{2K}, \tag{2}$$

wherein a segment is a mixture of two distributions comprising a first distribution of mean $\mu_n$ with n time samples and a second distribution of mean $\mu_m$ with m time samples, and K is the estimate of data variance. The performance analyzer 102 can further comprise a logic 126 that estimates the data variance K by taking variance of data after excluding a selected lowest percentile and a selected highest percentile of data values.

Figure 1D:
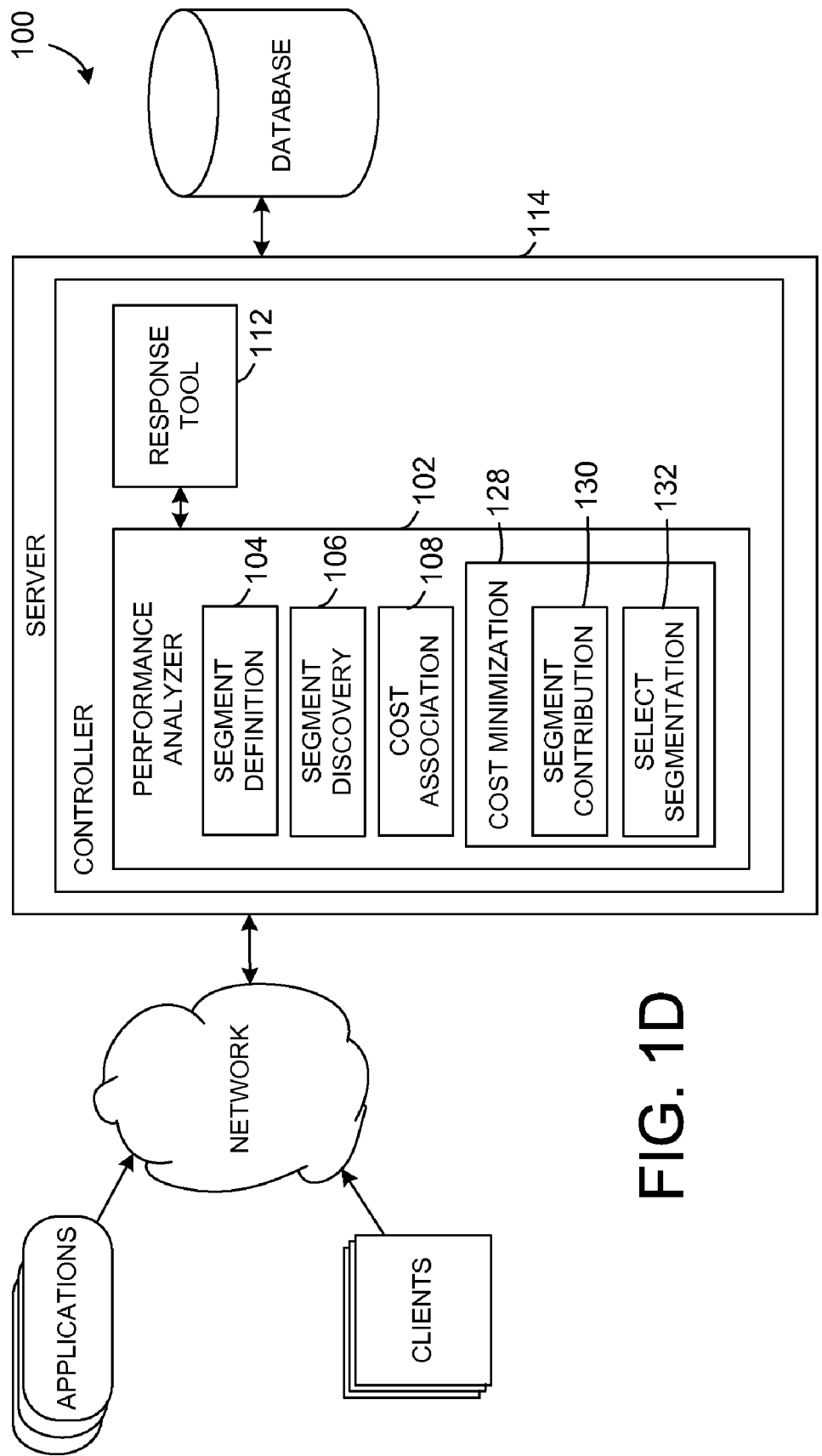

Referring to FIG. 1D, an IT management system embodiment can include a performance analyzer 102 further comprising a logic 128 that globally minimizes equation $\min_S\{C_S+\lambda(\text{Number of Segments})\}$ using dynamic programming wherein $C_S$ is cost of segmentation S for a monotonic function of segment number. The logic 128 comprises a logic 130 that determines the contribution of a segment (i,j) to equation $\min_S\{C_S+\lambda(\text{Number of Segments})\}$ according to equation (3), as follows:

$$w_{i,j} = \frac{1}{K}\sum_{t=1}^{j}(X_t - \mu_{i,j})^2 + \lambda, \tag{3}$$

wherein $X_t$ is a value of the performance metric, $\mu_{i,j}$ is an average value of the performance metric between time samples i and j, $\lambda$ is a compactness parameter, and K is estimated data variance. The performance analyzer 102 can further comprise a logic 132 that determines segmentation that minimizes segment cost sum by setting n=1 and $s_1=w_{1,1}$, setting n=n+1, and setting $s_n=\min_{1 \leq k < n} s_k+w_{k,n}$, and setting $k_n=\text{argmin}_{1 \leq k < n}(s_k+w_{k,n})$ for n<N for an ordered set of N samples with segment costs $w_{i,j}$.

Referring to FIG. 2, a schematic block diagram depicts an embodiment of an article of manufacture 250 implementing an automated information technology (IT) management system that optimizes temporal segmentation. The illustrative article of manufacture 250 comprises a controller-usable medium 252 having a computer readable program code 254 embodied in a controller 256 for detecting changes in a performance metric. The computer readable program code 254 causes the controller 256 to define a plurality of temporal segments as sets of contiguous time samples wherein time samples within a segment are mutually more similar in terms of performance metric behavior than time samples in previous and subsequent segments. The program code 254 further causes the controller 256 to discover the segments using an information-theoretical approach comprising discovering number of segments, discovering starting and ending time samples for the segments, and discovering statistical character of the segments comprising mean vectors and covariance matrices. The program code 254 also causes the controller 256 to associate cost with the segments that is lesser for homogeneous metric behavior and greater for heterogeneous metric behavior within a segment. The program code 254 further causes the controller 256 to find segmentation that minimizes the cost using dynamic programming.

Figures 3C, 3D:
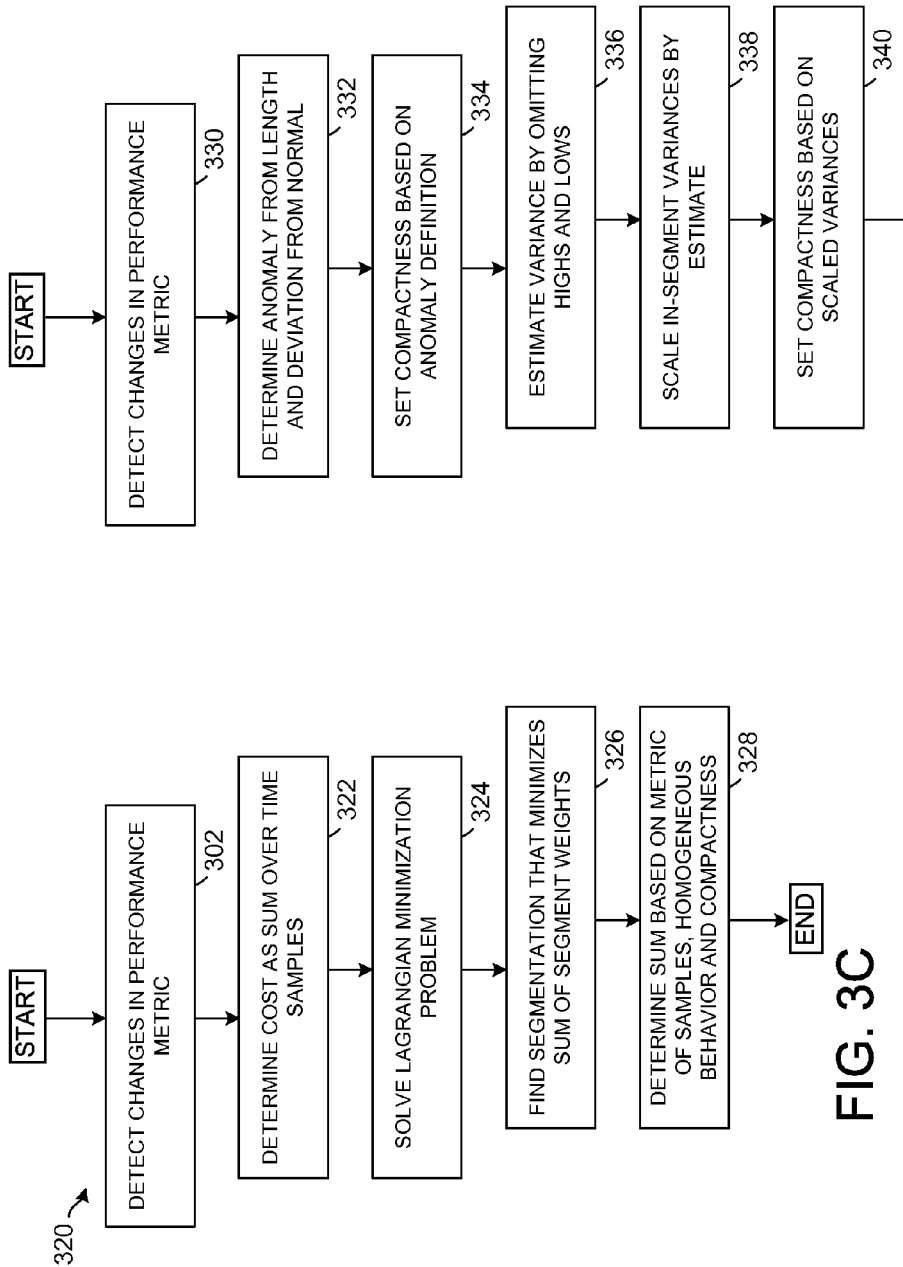

Referring to FIGS. 3A through 3D, flow charts illustrate one or more embodiments or aspects of a computer-executed method for determining optimum temporal segmentation for automated information technology (IT) management. FIG. 3A depicts a computer-executed method 300 for detecting 302 changes in a performance metric in an automated information technology (IT) management system comprising defining 304 a plurality of temporal segments as sets of contiguous time samples wherein time samples within a segment are mutually more similar in terms of performance metric behavior than time samples in previous and subsequent segments, and discovering 306 the segments using an information-theoretical approach. The segments can be discovered 306 by discovering 308 the number of segments, discovering 310 starting and ending time samples for the segments, and discovering 312 statistical character of the segments comprising mean vectors and covariance matrices.

Referring to FIG. 3B, detecting 302 changes in the performance metric can further comprise associating 314 cost with the segments that is lesser for homogeneous metric behavior and greater for heterogeneous metric behavior within a segment, and finding 316 segmentation that minimizes the cost using dynamic programming.

Referring to FIG. 3C, a computer-executed method 320 for detecting changes in a performance metric can further comprise determining 322 the cost as a sum over a plurality of time samples of a square of difference between a metric value of individual samples and an indicator of homogenous behavior.

In an example implementation, the indicator of homogenous behavior can be variance.

In some embodiments, the method 320 can further comprise solving 324 a Lagrangian minimization problem for a predetermined compactness parameter. The Lagrangian minimization problem can be solved 324 by finding 326 a segmentation that minimizes a sum of segment weights, and determining 328 the sum of segment weights as a square of a difference between a quantity comprising the metric value of individual samples and the indicator of homogenous behavior, increased by the compactness parameter determined using dynamic programming.

For example, a segment can be formed for a condition that the ratio of a decrease in cost to an increase in segment number resulting from existence of the segment is larger than the compactness parameter.

Referring to FIG. 3D, a computer-executed method 330 for detecting changes in a performance metric can further comprise defining 332 an anomaly based on a determination of length of an anomalous segment and deviation of the anomalous segment from normal behavior. The compactness parameter can be set 334 based on the anomaly definition.

The method 330 can further comprise determining 336 an estimate of data variance by excluding data values in a selected lowest percentile and a selected highest percentile, and scaling 338 within-segment variances by the estimate of data variance. The compactness parameter can be set 340 data-independently based on length of scaled anomaly and deviation of the anomaly from normal behavior.

In some embodiments, the Lagrangian minimization can be solved to globally minimize over all possible segmentations and discover number, locations, and character of the segments.

The method can further comprise detecting changes in service conditions, and detecting changes in cyclic performance behavior.

Referring to FIGS. 4A through 4D, flow charts illustrate one or more embodiments or aspects of a computer-executed method for determining optimum temporal segmentation for automated information technology (IT) management. FIG. 4A depicts a computer-executed method 400 for detecting 402 changes in a performance metric in an automated information technology (IT) management system comprising collecting 404 performance metrics over time as a plurality of temporal segments comprising contiguous time samples wherein time samples within a segment are mutually more similar than time samples in previous and subsequent segments. A weighted cost of segmentation $w_{i,j}$ is determined 406 according to equation (4) as follows:

$$w_{i,j} = \sum_{t=i}^{j} (X_t - \mu_{i,j})^2 + \lambda, \tag{4}$$

wherein $X_t$ is a value of the performance metric, $\mu_{i,j}$ is an average value of the performance metric between time samples i and j, and $\lambda$ is a compactness parameter. Segmentation is found 408 that minimizes the sum of segment weights $w_{i,j}$ for a specified value of $\lambda$ using dynamic programming.

Referring to FIG. 4B, an embodiment of a method 410 for detecting changes in a performance metric in an automated information technology (IT) management system can further comprise constraining 412 the sum of segment weights $w_{i,j}$ by entropy, and determining 414 a weighted cost of segmentation $w_{i,j}$ according to equation (5):

$$w_{i,j} = \sum_{t=i}^{j} (X_t - \mu_{i,j})^2 + \lambda(i-j) \cdot \log(i-j). \tag{5}$$

Referring to FIG. 4C, a method 420 for detecting changes in a performance metric can further comprise defining 422 an anomaly determined by a length m of an anomalous segment and deviation of the anomalous segment from normal behavior, and setting 424 the compactness parameter $\lambda$ according to the defined anomaly. The compactness parameter $\lambda$ can be scaled 426 by an estimate of data variance according to equation (6):

$$\lambda = \frac{m(\mu_n - \mu_m)^2}{2K}, \quad (6)$$

wherein a segment is a mixture of two distributions comprising a first distribution of mean $\mu_n$ with n time samples and a second distribution of mean $\mu_m$ with m time samples, and K is the estimate of data variance. The data variance K can be estimated 428 by taking variance of data after excluding a selected lowest percentile and a selected highest percentile of data values.

In an example implementation, the compactness parameter $\lambda$ can be set 424 based on anomaly length and anomaly deviation from normal behavior by analyzing 430 the anomaly according to a formula $ab^2/2$ wherein a is anomaly length and b is distance of normal from abnormal normalized by normal variance K.

Referring to FIG. 4D, a method 440 for detecting changes in a performance metric can further comprise globally minimizing 442 equation $\min_S\{C_S+\lambda(\text{Number of Segments})\}$ using dynamic programming wherein $C_S$ is cost of segmentation S for a monotonic function of segment number. Global minimization 442 can comprise determining 444 contribution of a segment (i,j) to equation $\min_S\{C_S+\lambda(\text{Number of Segments})\}$ according to equation (7), as follows:

$$w_{i,j} = \frac{1}{K}\sum_{t=1}^{j}(X_t - \mu_{i,j})^2 + \lambda, \quad (7)$$

wherein $X_t$ is a value of the performance metric, $\mu_{i,j}$ is an average value of the performance metric between time samples i and j, $\lambda$ is a compactness parameter, and K is estimated data variance. Global minimization 442 can further comprise determining 446 segmentation that minimizes segment cost sum by setting n=1 and $s_1=w_{1,1}$; setting n=n+1 and $s_n=\min_{1\leq k<n}s_k+w_{k,n}$; and setting $k_n=\text{argmin}_{1\leq k<n}(s_k+w_{k,n})$ for n<N; for an ordered set of N samples with segment costs $w_{i,j}$.

The illustrative techniques can focus on the discovery of the changes or the segments, rather than determining which of the segments is anomalous. The segmentation problem can be viewed as an optimization problem. The optimization problem can be solved through dynamic programming.

The illustrative optimum temporal segmentation technique, performance metrics collected over time are viewed as comprising temporal segments, where a segment is a set of contiguous time samples such that the time samples within the segment are more similar (in terms of performance metric behavior) to one another than the time samples in the previous and next segments. An information-theoretic approach to discovering the segments is derived. Such information-theoretic approaches including discovering the number of segments, the time samples at when each segment starts and ends, and the statistical character of the segments such as mean vectors and covariance matrices, and others.

A segmentation S is defined with the starting time samples of the segments, where the index $i_k$ is used to denote the start sample of the kth segment of the segmentation. Thus, each S is uniquely defined by a set of $i_k$s. Each segmentation S is associated with a cost. Intuitively, the cost is selected to be small if the metric behavior within the segments of the segmentation is homogenous, and large if the behavior is highly heterogeneous. A technique for setting of the cost and use of dynamic programming to find segmentation which minimizes the cost are disclosed hereinafter.

Typically, the cost $C_S$, of segmentation S can be selected as a sum of segment variances, such as according to equation (8) as follows:

$$C_S = \sum_{i_k \in S}\sum_{t=i_k}^{i_k-1}(X_t - \mu_{i_k,i_k-1})^2; \quad (8)$$

where $X_t$ is the value of the metric, for example response time, throughput, CPU utilization, and the like, at time sample t, and $\mu_{i_k,i_k-1}$ is the average metric value between time samples $i_k$ and $i_{k-1}$. The variance is a reasonable choice since low variance is often a good indicator of homogenous behavior. However, the weight can be set to other measures of homogeneity as well.

The goal of segmentation is not only to find a set of homogeneous segments, but also to find a compact set of homogeneous segments. A compact representation is defined as a representation with as few segments as possible. Without the compactness criterion, segmentation is not meaningful since the segmentation that minimizes equation (8) is that for which each segment has only one time sample.

With introduction of the compactness constraint, the segmentation problem evolves into a minimization problem $\min_S C_S$ given the number of segments or some monotonic function of the number of segments. The minimization problem in can be posed as a Lagrangian problem of the form $\min_S\{C_S+\lambda(\text{Number of Segments})\}$.

The information-theoretic entropy of segment lengths can be used rather than the number of segments as a constraint since entropy of segment lengths increases each time a segment is broken into multiple segments.

The Lagrangian minimization problem is equivalent to finding the segmentation S that minimizes the sum of segment weights, where a segment weight is equal to equation (9):

$$w_{i,j} = \sum_{t=i}^{j}(X_t - \mu_{i,j})^2 + \lambda. \quad (9)$$

The relationship can be verified by adding equation (9) over all segments of a segmentation, leading to the term $\{C_S+\lambda(\text{Number of Segments})\}$. In contrast, if entropy is used as a constraint the segment cost is given in equation (10):

$$w_{i,j} = \sum_{t=i}^{j}(X_t - \mu_{i,j})^2 + \lambda(i-j)\cdot\log(i-j). \quad (10)$$

Dynamic programming can be used to find the segmentation that minimizes the sum of segment weights for a given value of $\lambda$, specifically the segmentation that solves the Lagrangian minimization problem for a given value of $\lambda$.

Thus, each segment is associated with a cost given that the value of the parameter $\lambda$. The value of parameter $\lambda$ can be set based on an intuitive description of "anomaly" in performance metric behavior.

Based on the Lagrangian formulation, a relationship exists according to expression (11):

$$\lambda \le \frac{\Delta C_S}{\Delta \text{ Number of Segments}}, \quad (11)$$

such that a segment is formed if and only if the ratio of the decrease in the cost $C_S$ to the increase in the number of segments due to existence the formed segment is larger than $\lambda$.

Thus $\lambda$ is determined based on the value ($\Delta C_S/\Delta$Number of Segments) for the segmentation problem. Each time a new segment is formed the number of segments increases by 2, so that $\Delta G=2$. To find the decrease in the cost each time a segment is formed, a segment can be considered as a mixture of two distributions including one distribution around a mean of $\mu_n$ with n time samples, and a second distribution about a mean of $\mu_m$ with m time samples. The mean $\mu$ of the segment is given by equation (12):

$$\mu = \frac{\mu_n n + \mu_m m}{n+m}, \quad (12)$$

and the cost of the segment can be represented as in equation (13):

$$D = n\sigma_n^2 + m\sigma_m^2 + n(\mu_n - \mu)^2 + m(\mu_m - \mu)^2 \quad (13)$$
$$= n\sigma_n^2 + m\sigma_m^2 + \frac{nm^2}{(n+m)^2}(\mu_n - \mu_m)^2 +$$
$$\frac{mn^2}{(n+m)^2}(\mu_n - \mu_m)^2.$$

Following from equations (12) and (13) is equation (14) as follows:

$$\sum_n (\mu_n - \mu)^2 = \sum_n ((x_m - \mu_n) + (\mu_n - \mu))^2 \quad (14)$$
$$= n\sigma_n^2 + n(\mu_n - \mu)^2.$$

Alternatively, each distribution can be by an associated segment and the cost would be $n\sigma_n^2 + m\sigma_m^2$. Thus the additional cost $\Delta C$ due to modeling the two distributions with a single segment is given by expression (15):

$$\Delta C = \frac{nm^2}{(n+m)^2}(\mu_n - \mu_m)^2 + \frac{mn^2}{(n+m)^2}(\mu_n - \mu_m)^2 \quad (15)$$
$$= \frac{mn}{n+m}(\mu_n - \mu_m)^2.$$

Assuming n is much larger than m so that the anomalous segment length is much longer than the normal segment length, the expression simplifies to equation (16):

$$\Delta C = m(\mu_n - \mu_m)^2, \quad (16)$$

so that:

$$\lambda \le \frac{m(\mu_n - \mu_m)^2}{2}. \quad (17)$$

Thus, the value of $\lambda$ can be set based on a definition of anomaly, determined by the length m of an anomalous segment and the deviation of the anomalous segment from normal behavior.

One problem with expression (17) is that $\lambda$ varies with the scale of the metrics, a problem that is avoided by scaling all within segment variances by K, where K is an estimate of the data variance, to result in expression (18):

$$\lambda \le \frac{m(\mu_n - \mu_m)^2}{2K}. \quad (18)$$

One technique for estimating value K is by taking the variance of the data after excluding the lowest 5 and the top 5 percent of the data values.

The resulting technique is data-independent and sets $\lambda$ based on the length of anomaly and deviation of the anomaly from normal behavior. The formula is $a \cdot b^2/2$, where a is the length of anomaly and b is the distance of the normal from the abnormal (the distance of means) normalized by the normal variance, K. A reasonable setting for $\lambda$ is a value between approximately 20 and 50 for any data. For example, with a setting of 20 a segment is anomalous if lasting at least 10 samples and the b value is at least 2. Similarly a segment with the setting 20 is anomalous if lasting at least 20 samples and the b value is at least 1, and the like. The result is reasonable segmentation with a few possible occurrences of over-segmentation.

The segment weight for the segment (i, j) is a Lagrangian sum of two terms, one term that enforces homogeneity and a second term that enforces compactness. Two reasonable choices for the homogeneity term are (scaled) segment variance according to expression (19), and Gaussian-based distortion according to expression (20):

$$\frac{1}{K}\sum_{t=i}^{j}(X_t - \mu_{i,j})^2; \quad (19)$$

$$\log\sum_{t=i}^{j}(X_t - \mu_{i,j})^2. \quad (20)$$

Gaussian-based distortion has an advantage over segment variance in that the Gaussian-based distortion is naturally scaled as a logarithm, since the difference of two logarithms is a ratio. Thus, a further scaling is superfluous. With segment variance, scaling is used as discussed hereinabove.

Suitable choices for the compactness term are the number of segments $\lambda$, and entropy of segments $\lambda(I-j) \cdot \log(i-j)$.

An illustrative technique uses (scaled) segment variance and the number of segments as the weight terms, thus resulting in an intuitive approach to setting the value of the parameter $\lambda$.

Dynamic programming can be used to globally minimize expression $\min_S\{C_S + \lambda(\text{Number of Segments})\}$ over all possible segmentations, and discover the number, the locations, and the character of the segments. The contribution of segment (i, j) to expression $\min_S\{C_S + \lambda(\text{Number of Segments})\}$ with the inclusion of parameter K is given in equation (21) as follows:

$$w_{i,j} = \frac{1}{K}\sum_{t=i}^{j}(X_t - \mu_{i,j})^2 + \lambda, \qquad (21)$$

and the problem of minimizing expression $\min_S\{C_S+\lambda\}$ is equivalent to finding the segmentation that minimizes the sum of segment weights given in equation (21).

For an ordered set of N samples with segment costs $w_{i,j}$, the segmentation that minimizes the segment cost sum can be found by setting n=1 and setting $s_1$ equal to $w_{1,1}$, setting n=N+1 and setting $s_n = \min_{1 \leq k < n}(s_k + w_{k,n})$ and $k_n = \operatorname{argmin}_{1 \leq k < n}(s_k + w_{k,n})$ for n<N, then stopping. In the illustrative technique, value $s_n$ is the minimum of expression $\min_S\{C_S+\lambda\}$ over the first n samples. The optimum segmentation of the first n samples is the optimum segmentation of the first $k_n$ samples, which were found in step $k_n$, appended by the single segment that extends from sample $k_n$ to sample n. Accordingly, the technique, which is a special case of dynamic programming, is used to find the optimum segmentation of the metric data.

In contrast to the dynamic programming technique depicted herein, time-series segmentation refers to the partitioning of a time-series into temporal segments, where each segment is summarized by one or a few values, such as the mean of the data points in the segment. Segmentation of time-series is relevant to many disciplines including change point detection, data mining, classification, and clustering. Dynamic programming, although also a time-series segmentation technique, is less common than three classical approaches to segmentation including sliding window, top-down, and bottom-up techniques. Each of the three sliding window, top-down, and bottom-up approaches seek to find a sub-optimal segmentation of the time-series by minimizing a cost function. The cost function can be, for instance, the average mean-squared error between the data points and the mean value of the segment containing the data points.

In the sliding window technique, a segment is grown until some error bound on the cost function is exceeded at which point a new segment starts. Each time the error bound is exceeded, a new segment starts and the process is repeated until the end of the time-series is reached.

In the top-down technique, the time-series is recursively partitioned until a stopping criterion such a pre-defined number of total segments or an average mean-squared error is reached. At each step of the recursion, each point of the time-series is tested to find the split point that minimizes the cost function.

The bottom-up technique starts with N segments, where N is the length of the time-series, and at each step combines the two segments that minimize the cost function.

All three approaches are sub-optimal in terms of minimizing the cost function. Specifically, at each step the approaches find the partition that minimizes the cost function only for that step and do not necessarily find the segmentation that minimizes the cost function. All three approaches have O(N) complexity, in which the total number of segments is assumed to be much smaller than N. The dynamic programming technique has a greater computational complexity (O(N2)) than the three classical approaches, but is optimum in terms of minimizing the cost function.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A controller-executed method for detecting changes in a performance metric in an automated information technology (IT) management system comprising:
   defining, using a hardware processor, segments as sets of contiguous time samples wherein time samples within a particular segment are mutually more similar in terms of performance metric behavior than time samples in previous and subsequent segments;
   determining, using the hardware processor, for each of the segments, a weighted cost based on a compactness parameter and a sum over a plurality of time samples derived from a difference between a metric value for each of the plurality of time samples and an average value of the performance metric for the plurality of time samples; and
   finding, using the hardware processor, a segmentation that minimizes a sum of the weighted costs for the segments.

2. The method according to claim 1 wherein determining the weighted cost for each of the segments is based on the compactness parameter and a sum over the plurality of time samples of a square of the difference between the metric value for each of the plurality of time samples and the average value of the performance metric for the plurality of time samples.

3. The method according to claim 1 wherein the compactness parameter is based on an anomaly definition.

4. The method according to claim 1 further comprising:
   detecting changes in service conditions using the segmentation; and
   detecting changes in cyclic performance behavior using the segmentation.

5. An automated information technology (IT) management system comprising:
a computer comprising:
a hardware processor to execute:
logic to define segments as sets of contiguous time samples wherein time samples within a particular segment are mutually more similar in terms of performance metric behavior than time samples in previous and subsequent segments;
logic to determine, for each of the segments, a weighted cost based on a compactness parameter and a sum over a plurality of time samples derived from a difference between a metric value for each of the plurality of time samples and an average value of the performance metric for the plurality of time samples; and
logic to find a segmentation that minimizes a sum of the costs for the segments.

6. The system according to claim 5 further comprising:
a response tool executable in the computer to respond to detection of changes in the performance metric.

7. The system according to claim 5:
wherein the computer further comprises:
logic to determine the weighted cost $w_{i,j}$ for each of the segments according to an equation:

$$w_{i,j} = \sum_{t=i}^{j} (X_t - \mu_{i,j})^2 + \lambda$$

wherein $X_t$ is the metric value, $\mu_{i,j}$ is the average value of the performance metric, and $\lambda$ is the compactness parameter.

8. The system according to claim 5:
wherein the logic to find the segmentation is based on a compactness parameter $\lambda$, and wherein the performance analyzer further comprises:
logic to define an anomaly determined by a length m of an anomalous segment and deviation of the anomalous segment from normal behavior;
logic to determine the compactness parameter $\lambda$ according to the defined anomaly; and
logic to scale the compactness parameter $\lambda$ by an estimate of a data variance according to an equation:

$$\lambda = \frac{m(\mu_n - \mu_m)^2}{2K},$$

wherein a segment is a mixture of two distributions comprising a first distribution of mean $\mu_n$ with n time samples and a second distribution of mean $\mu_m$ with m time samples, and K is the estimate of data variance.

9. The system according to claim 5:
wherein the computer further comprises:
logic to determine the weighted cost $w_{i,j}$ for each of the segments according to equation:

$$w_{i,j} = \frac{1}{K} \sum_{t=i}^{j} (X_t - \mu_{i,j})^2 + \lambda$$

wherein $X_t$ is the metric value, $\mu_{i,j}$ is the average value of the performance metric, $\lambda$ is the compactness parameter, and K is estimated data variance.

10. An article of manufacture comprising:
a non-transitory computer-readable storage medium storing computer readable program codes executable by a computer for detecting changes in a performance metric, the computer readable program codes comprising:
code causing the computer to define segments as sets of contiguous time samples wherein time samples within a particular segment are mutually more similar in terms of performance metric behavior than time samples in previous and subsequent segments;
code causing the computer to determine, for each of the segments, a weighted cost based on a compactness parameter and a sum over a plurality of time samples derived from a difference between a metric value for each of the plurality of time samples and an average value of the performance metric for the plurality of time samples; and
code causing the computer to find a segmentation that minimizes a sum of the weighted costs for the segments.

* * * * *